US012481630B1

United States Patent
Kornfield et al.

(10) Patent No.: US 12,481,630 B1
(45) Date of Patent: Nov. 25, 2025

(54) OPTIMIZING FILE STORAGE IN DATA LAKE TABLES

(71) Applicant: Google LLC, Mountain View, CA (US)

(72) Inventors: Elie Micah Kornfield, Seattle, WA (US); Anoop Kochummen Johnson, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/770,623

(22) Filed: Jul. 11, 2024

(51) Int. Cl.
*G06F 16/22* (2019.01)
*G06F 16/28* (2019.01)

(52) U.S. Cl.
CPC ........ *G06F 16/221* (2019.01); *G06F 16/2246* (2019.01); *G06F 16/285* (2019.01)

(58) Field of Classification Search
CPC .................................................. G06F 16/221
USPC ........................................................ 707/713
See application file for complete search history.

(56) References Cited

U.S. PATENT DOCUMENTS

| | | | | |
|---|---|---|---|---|
| 10,810,472 B2* | 10/2020 | Malak | ...................... | G06F 40/30 |
| 2011/0029636 A1* | 2/2011 | Smyth | .................... | G06F 16/958 |
| | | | | 709/217 |
| 2013/0226959 A1* | 8/2013 | Dittrich | ............... | G06F 16/2453 |
| | | | | 707/769 |
| 2015/0347426 A1* | 12/2015 | Dickie | .................. | G06F 16/221 |
| | | | | 707/693 |

* cited by examiner

*Primary Examiner* — Syling Yen
(74) *Attorney, Agent, or Firm* — Honigman LLP; Brett A. Krueger

(57) ABSTRACT

A method for optimizing file storage includes receiving columnar data to store at a columnar data store with columns ordered with an initial ordering. The method includes determining, based on historical access patterns for the columnar data store, an updated ordering for the columns. The method includes storing the columnar data at a first location of the columnar data store using the updated ordering. The method includes determining that the stored columnar data is to be compacted and compressing at least a portion of the columnar data using each of a plurality of compression techniques. The method includes, based on compressing the at least a portion of the columnar data, selecting one of the plurality of compression techniques. The method includes storing the columnar data at a second location of the columnar data store using the selected one of the plurality of compression techniques.

18 Claims, 5 Drawing Sheets

OPTIMIZING FILE STORAGE IN DATA LAKE TABLES

TECHNICAL FIELD

This disclosure relates to optimizing file storage in data lake tables.

BACKGROUND

Data lake tables generally refer to a collection of files. Typically, these files are periodically rewritten or merged to optimize query performance when querying the collection of files. A typical model for rewriting files is to form a log structured merge (LSM) tree by heuristically combining files at lower levels based on file size and/or the time that the file has been left unmodified in the system. Typically, for analytical workloads, column-oriented files are used (i.e., columnar databases). Columnar files generally apply compression at individual column level or at partitions of the column level with the columns stored in the file in the same order the column appears in the schema.

SUMMARY

One aspect of the disclosure provides a method for optimizing file storage in data lake tables. The computer-implemented method, when executed by data processing hardware, causes the data processing hardware to perform operations. The operations include receiving columnar data to store at a columnar data store that includes a plurality of columns ordered with an initial ordering. The operations also include determining, based on historical access patterns for the columnar data store, an updated ordering for the plurality of columns and storing the columnar data at a first location of the columnar data store using the updated ordering for the plurality of columns. The operations include determining that the stored columnar data is to be compacted and compressing at least a portion of the columnar data using each of a plurality of compression techniques. The operations also include, based on compressing the at least a portion of the columnar data using each of the plurality of compression techniques, selecting one of the plurality of compression techniques. The operations include storing the columnar data at a second location of the columnar data store using the selected one of the plurality of compression techniques.

Implementations of the disclosure may include one or more of the following optional features. In some implementations, the columnar data store includes a log structured merge (LSM) tree. In some of these implementations, determining that the stored columnar data is to be compacted is based on a compaction event for the LSM tree. A quantity of the plurality of compression techniques may be based on a level of the LSM tree the columnar data is to be stored at.

In some examples, the updated ordering for the plurality of columns is based on a co-occurrence of at least two columns of the plurality of columns in the historical access patterns. Optionally, determining the updated ordering for the plurality of columns includes predicting, using a model, a co-occurrence of a first column of the plurality of columns with a second column of the plurality of columns. Determining the updated ordering for the plurality of columns may include using a clustering algorithm. In some implementations, the operations further include determining a target file size for the columnar data and storing the columnar data at the second location of the columnar data store further using the determined target file size.

Optionally, the operations further include, after storing the columnar data at the second location of the columnar data store, determining that the stored columnar data is to be compacted again; compressing the at least a portion of the columnar data using each of a second plurality of compression techniques different than the plurality of compression techniques; and based on compressing the at least a portion of the columnar data using each of the second plurality of compression techniques, selecting one of the second plurality of compression techniques. The operations may also further include storing the columnar data at a third location of the columnar data store using the selected one of the second plurality of compression techniques. In some examples, selecting the one of the plurality of compression techniques is further based on a storage cost of the one of the one of the plurality of compression techniques and a processing cost of the one of the plurality of compression techniques.

Another aspect of the disclosure provides a system for optimizing file storage in data lake tables. The system includes data processing hardware and memory hardware in communication with the data processing hardware. The memory hardware stores instructions that when executed on the data processing hardware cause the data processing hardware to perform operations. The operations include receiving columnar data to store at a columnar data store that includes a plurality of columns ordered with an initial ordering. The operations also include determining, based on historical access patterns for the columnar data store, an updated ordering for the plurality of columns and storing the columnar data at a first location of the columnar data store using the updated ordering for the plurality of columns. The operations include determining that the stored columnar data is to be compacted and compressing at least a portion of the columnar data using each of a plurality of compression techniques. The operations also include, based on compressing the at least a portion of the columnar data using each of the plurality of compression techniques, selecting one of the plurality of compression techniques. The operations include storing the columnar data at a second location of the columnar data store using the selected one of the plurality of compression techniques.

This aspect may include one or more of the following optional features. In some implementations, the columnar data store includes a log structured merge (LSM) tree. In some of these implementations, determining that the stored columnar data is to be compacted is based on a compaction event for the LSM tree. A quantity of the plurality of compression techniques may be based on a level of the LSM tree the columnar data is to be stored at.

In some examples, the updated ordering for the plurality of columns is based on a co-occurrence of at least two columns of the plurality of columns in the historical access patterns. Optionally, determining the updated ordering for the plurality of columns includes predicting, using a model, a co-occurrence of a first column of the plurality of columns with a second column of the plurality of columns. Determining the updated ordering for the plurality of columns may include using a clustering algorithm. In some implementations, the operations further include determining a target file size for the columnar data and storing the columnar data at the second location of the columnar data store further using the determined target file size.

Optionally, the operations further include, after storing the columnar data at the second location of the columnar data store, determining that the stored columnar data is to be compacted again; compressing the at least a portion of the columnar data using each of a second plurality of compression techniques different than the plurality of compression techniques; and based on compressing the at least a portion of the columnar data using each of the second plurality of compression techniques, selecting one of the second plurality of compression techniques. The operations may also further include storing the columnar data at a third location of the columnar data store using the selected one of the second plurality of compression techniques. In some examples, selecting the one of the plurality of compression techniques is further based on a storage cost of the one of the one of the plurality of compression techniques and a processing cost of the one of the plurality of compression techniques.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
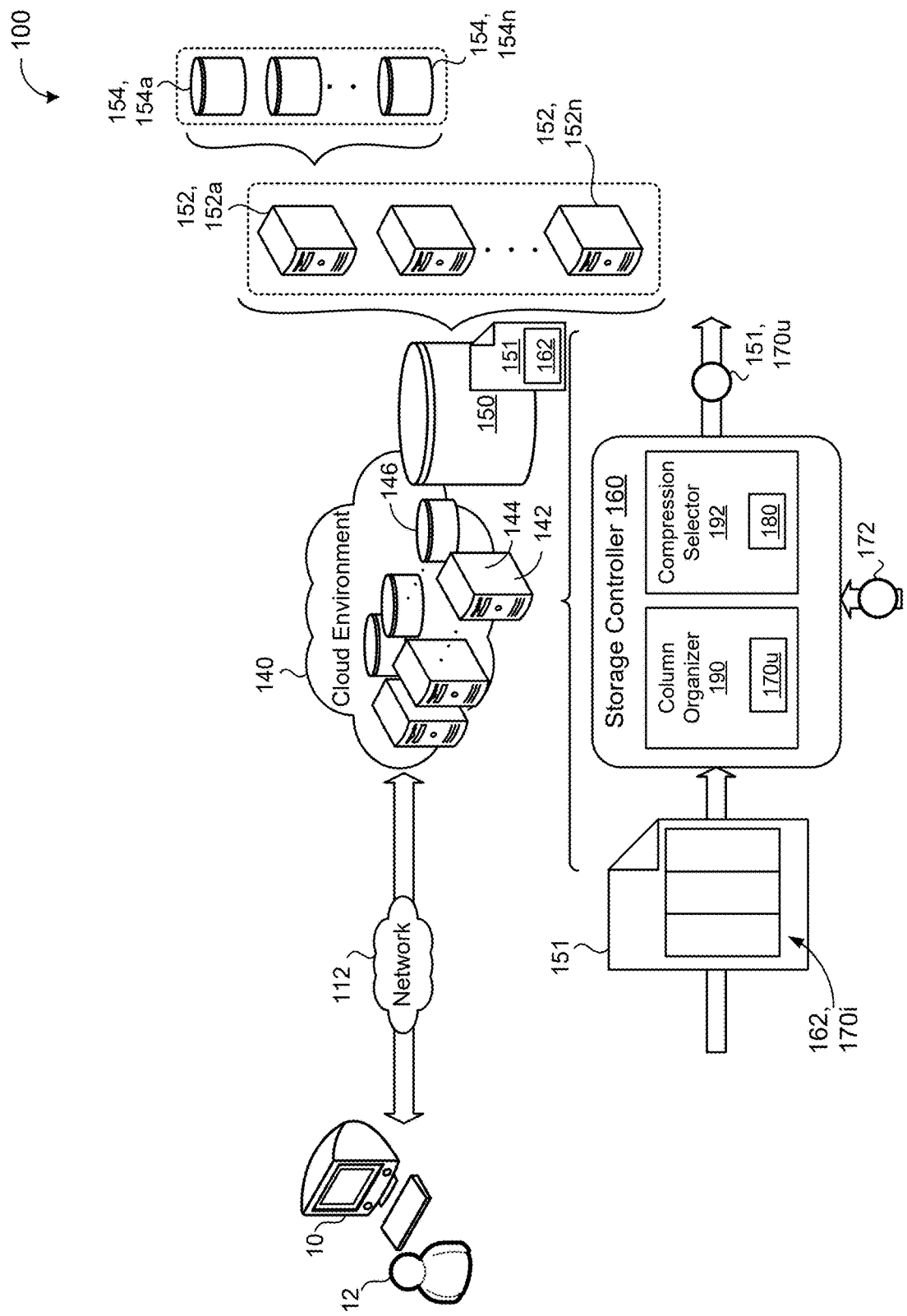
FIG. 1 is a schematic view of an example system for optimizing file storage in data lake tables.

A data lake is a centralized data store that stores and allows for processing of large quantities of data without changing the form of the data. Data lake tables generally refers to a collection of files that are stored within a data lake. Typically, these files are periodically rewritten or merged to optimize query performance when querying the collection of files. A log structured merge (LSM) tree is a data structure that efficiently stores data for retrieval in storage systems using a combination of memory and persistent disk structures. A typical model for rewriting files is to form an LSM tree by heuristically combining files at lower levels based on file size and/or the time that the file has been left unmodified in the system. Typically, for analytical workloads, column-oriented files are used (i.e., columnar databases). Columnar files generally apply compression at individual column level (or at partitions of the column level with the columns stored in the file in the same order the column appears in the schema).

More specifically, when writing columnar data files to a data lake, a variety of decisions are made with respect to how to store the data. This involves which parts of the file correspond to a typical column, as well as what type of compression to use to store the data. The compression mechanism is generally either statically chosen (e.g., via configuration) or some manual trial and error is used to determine the best layout for the data. This manual trial and error can be both time consuming and computationally wasteful. Optimal compression has a trade-off between overall bytes stored, the cost of compressing the data, and the cost of decompressing the data.

Data files are typically stored in object stores. These object stores typically have high latency for retrieving the first byte of data but have good throughput. A typical optimization for column-oriented readers is "read coalescing" by trying to minimize the number of reads to take advantage of high throughput by potentially reading discontinuous portions of the file together and discarding unneeded data. Discarded data is a waste of networking and computational resources. However, the waste associated with read coalescing can be reduced by optimizing a file's layout by placing data that is frequently accessed together into contiguous regions.

When using an LSM tree structure for storing data, files at leaves of the tree have shorter active time than those closer to the root of the tree (the root is the highest level of the tree). It is also expected that data higher in the tree will be accessed on average more frequently than values at the leaves (i.e., new data is added at leaves and then leaves are merged and moved up the tree to form larger files).

Accordingly, implementations herein include a data storage system and/or storage controller that, for files closer to the leaves on the tree, spends less effort on determining the compression/encoding of files. This is because effort in finding an optimal encoding is less valuable than for files further from the leaves, as the extra work is more likely to be wasted with files with shorter active times. Additionally, as files move further away from the leaves, the storage controller obtains more accurate statistics on column access patterns, thus can expend effort more efficiently on these files. Moreover, the controller expends more effort compressing data that is infrequently accessed, as the storage rather than the computational cost is likely to dominate the overall cost in the system. Furthermore, the controller considers whether a lower level of a tree has already discovered that a compression technique is completely suboptimal to determine optimal compression more efficiently.

Moreover, the controller, regardless of tree structure, optimizes file column layout to ensure placement of columns that are frequently accessed together appear contiguously to avoid wasted resources for read coalescing. The controller determines how to make trade-offs based on the inputs of storage cost, computational cost of various compression/decompression algorithms, and/or a level of the LSM tree (or predicted lifetime of the file). To optimize or select the compression/encoding, the controller may use one or more of a simple heuristic model, a closed-form optimization model (e.g. linear programming), and/or a self-adapting machine learning or artificial intelligence (AI) system to self-tune over time based on observed usage of a collection of tables (e.g. for a specific customer).

Referring to FIG. 1, in some implementations, a distributed storage system 100 includes a remote system 140 in communication with one or more user devices 10 via a network 112. The remote system 140 is a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 may be configured to store data tables or data files 151 (e.g., a data lake). The data files 151 each include columns 162 and may be stored in a columnar-oriented format (i.e., a columnar database or data store). The data files 151 may also be referred to herein as columnar data 151. A columnar database, in contrast to a row-oriented database, stores data vertically in columns to enable faster queries and other data analytics.

In some implementations, the data store 150 maintains the data files 151 using a log-structured merge-tree (LSM tree) architecture. An LSM tree is a data structure that efficiently stores key-value pairs for retrieval in storage systems using a combination of memory and persistent disk structures. LSM trees include multiple layers 154, 154a-n (also referred to as levels) with the first level stored at memory (e.g., a memtable) and subsequent layers stored at one or more persistent disks (e.g., sstables). Data from each layer is periodically compacted to a higher layer. Compaction generally creates fewer (but larger) files at the lower layer.

Figure 2:
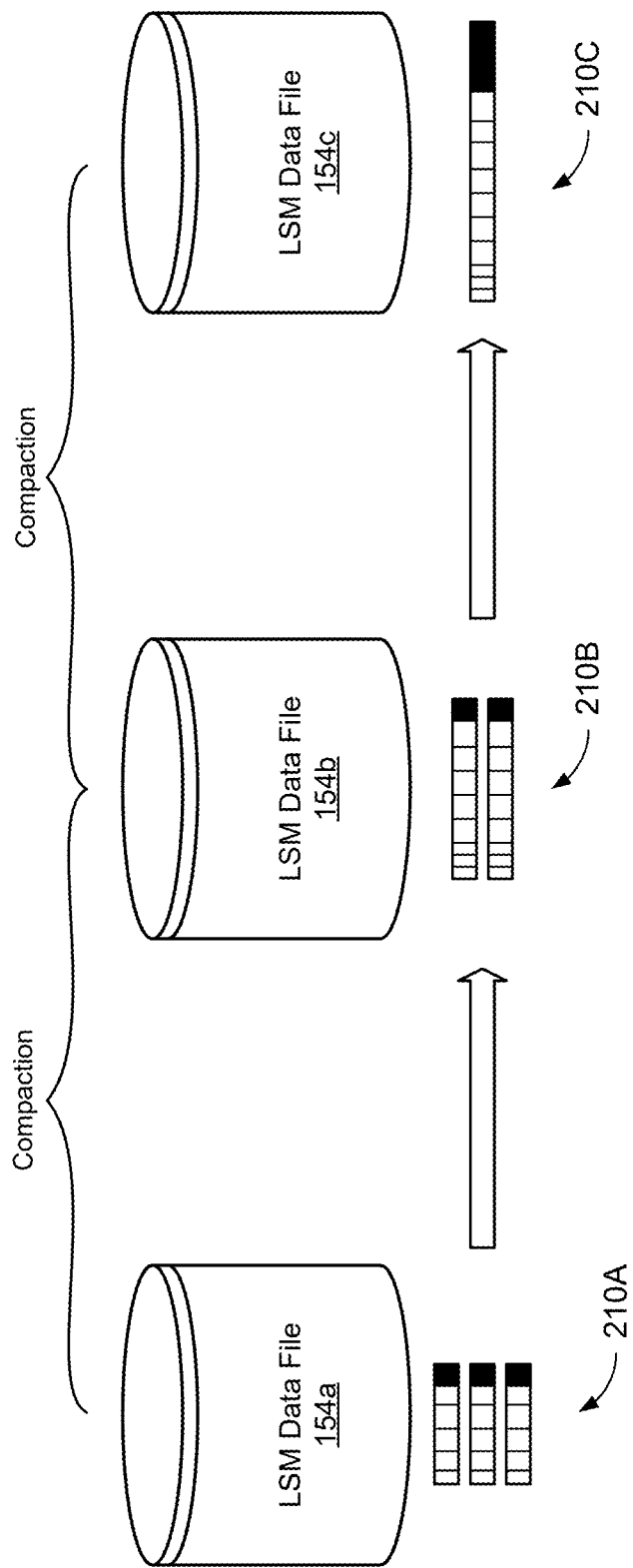
FIG. 2 is a schematic view of components of a database using a log-structured merge-tree (LSM tree) architecture.

Referring now to FIG. 2, a schematic view 200 includes exemplary components of a distributed database using an LSM tree architecture. Here, a first layer 154a of the LSM tree is a first LSM data file (e.g., a memtable). A second layer 154b of the LSM tree includes a second LSM file and a third layer 154c of the LSM tree includes a third LSM file. The LSM file(s) of the first layer 154a reside in volatile memory of the system while the LSM file(s) of the second and third layers 154b-c may reside on one or more persistent disks (e.g., hard drives, solid state drives, etc.). During compaction, data 210A stored at the first layer 154a is compacted and stored at the second layer 154b and data 210B stored at the second layer 154b is compacted and stored at the third layer 154c. The distributed database may include any number of layers and, for example, data 210C stored at the third layer 154c may be further compacted to lower layers 154.

Referring back to FIG. 1, the remote system 140 executes a storage controller 160. The storage controller 160 controls and optimizes storage of the data files 151 at the data store 150. For example, the storage controller 160 determines a format to store each data file 151 (e.g., which order to store the columns 162) and selects a compression/encoding technique to use when storing the data file 151. In some examples, the storage controller 160 selects one or more parameters of the compression technique. A compression algorithm or technique generally exploits redundancy or patterns in data to reduce a size of data representation without context specific to the data. An encoding algorithm or technique generally changes the data representation using data context. As used herein, references to compression algorithms and encoding algorithms can be used interchangeably.

The storage controller 160 receives one or more data files 151 (i.e., columnar data) that includes columns 162. The storage controller 160 may receive the data files 151 from the user 12 (e.g., for initial storage at the data store 150) or from any other system or application in communication with the storage controller 160 and remote system 140. The columns 162 of the data files 151 have an initial ordering 170i (e.g., based on a predetermined schema). The initial ordering defines an order the columns 162 are in relative to each other when the storage controller 160 receives the data files 151. The storage controller 160 may include a column organizer 190 that, based on historical access patterns 172 for the data store 15, determines an updated ordering 170u for the columns 162 of the data files 151. The historical access patterns 172 include, for example, a count of how often a particular column 162 was accessed by queries, a total number of queries run (which may be further delineated into number of reads and number of writes), and/or, for each pair of columns 162, how often the columns 162 were projected together in the same query. This data, in some examples, is aggregated into a hierarchical clustering to form a weighted tree where each intermediate node is a cluster of columns and leaves are individual columns. The weights on each branch may be the sum of accesses of the columns in the sub-tree. Based on the historical access patterns 172, each column 162 may be classified based on frequency of access. For example, a column 162 may be classified as high access, regular access, or low access. The classifications may be based on standard deviations, averages, etc.

The storage controller 160 stores the data files 151 at the data store 150 using the updated ordering 170u for the columns 162. For example, and as explained in more detail below, the column organizer 190 reorders the columns 162 based on a co-occurrence of at least two columns 162 in the historical access patterns 172. The historical access patterns 172 may be derived from queries made by users 12 (or other systems/programs) of the data store 150. The historical access patterns 172 may be based off queries from a particular user 12 or a particular group of users 12 (e.g., owners or otherwise associated with the data files 151, such as employees of a particular organization) or the historical access patterns 172 may be based off queries made by other users for other data files 151 that are similar to the data files 151.

The storage controller 160, in some examples, includes a compression selector 192. The compression selector 192 determines that the data files 151 are to be compacted. This may occur when first storing the data files 151 at the data store 150 (i.e., before the data files 151 are initially stored at the data store 150 with the updated ordering 170u) or after the data files 151 have been stored at the data store 150 (e.g., during a compaction event for the LSM tree). The storage controller 160 may compress at least a portion of one or more of the data files 151 using each of multiple different compression techniques 180. Based on these compressing the data files 151 using the multiple different compression techniques 180, the compression selector 192 selects one of the compression techniques 180. The storage controller 160 stores the data files 151 at the data store 150 using the selected one of the compression techniques 180.

Figure 3:
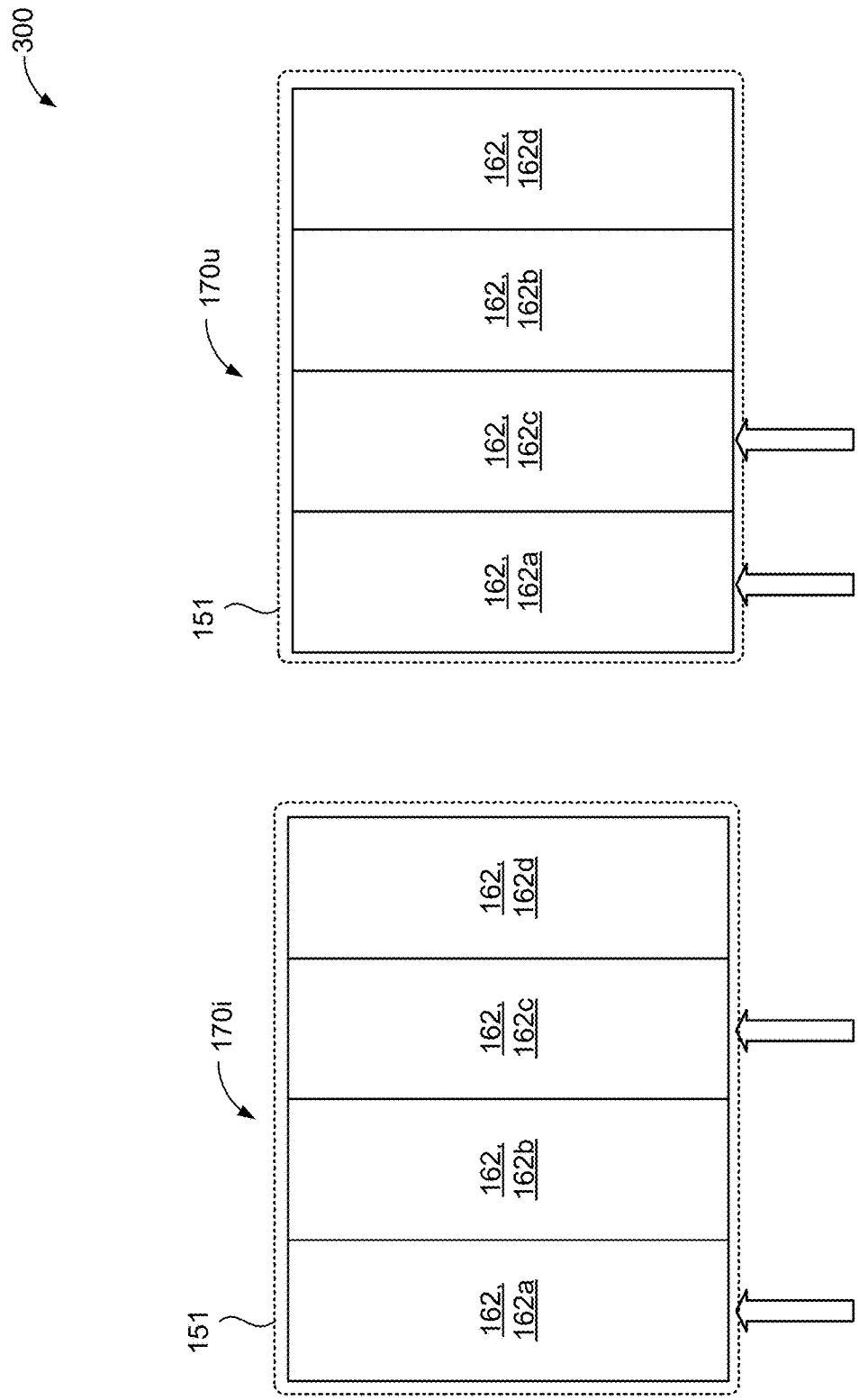
FIG. 3 is a schematic view of an initial ordering and an updated ordering of columns in a data file.

Referring now to FIG. 3, a schematic view 300 includes an exemplary illustration of an initial ordering 170i of columns 162, 162a-d of a data file 151. In some implementations, the column organizer 190 (FIG. 1) updates the ordering of the columns 162 based on a co-occurrence of at least two columns 162. That is, the column organizer 190 may update the ordering of the columns based on which columns 162 are often read together (e.g., during queries). The column organizer 190 may determine co-occurrence based on historical access patterns 172 of the data store 150 or other similar data stores 150 storing similar data files 151. Because the data store 150 may have high latency but also high throughput, performance can be increased by storing co-occurring columns 162 contiguously in memory and on disk so that a single read can retrieve both columns 162 without wasting memory and/or I/O bandwidth.

In the example of FIG. 3, the data file 151 has four columns 162a-d. An initial ordering 170i of the columns 162a-d (e.g., based on a schema or other definition of the data file 151) has a first column 162a followed by a second column 162b followed by a third column 162c, which is then followed by a fourth column 162d. In this example, based on historical access patterns 172 (FIG. 1), the column organizer 190 determines that the first column 162a and the third column 162c often co-occur. For example, the first column 162a is an "identification" column and the third column 162c is a "price" column and queries (e.g., from users 12) of the data store 150 frequently request the remote system 140 retrieve the first column 162a and the third column 162c together. Based on the historical access patterns 172, the column organizer 190 determines an updated ordering 170u for the data file 151 that places the first column 162a and the third column 162c next to each other or otherwise ensures that the first column 162a and the third column 162c are written contiguously to the data store 150. In this way, a single read of the data file 151 using the updated ordering 170u can read the first column 162a and the third column 162c without having to needlessly read the second column 162b (as a single read would be required to do when using the initial ordering 170i).

In some examples, the column organizer 190 uses a model to predict co-occurrence of a column 162 with another column 162. For example, a column 162 may be sufficiently new to the data store 150 and/or storage controller 160 such that the historical access patterns 172 do not include sufficient references to the new column 162. In this scenario, the model may predict a column 162 that the new column 162 may co-occur with. The prediction may be based on similarities between the new column and other columns 162, similarities between the data file 151 and other data files 151, and/or based on any other similarities apparent to the model. The model may be a heuristic algorithm (e.g., a clustering algorithm), a machine learning model (e.g., a neural network, or the like. The model may be trained (i.e., to update weights and parameters of the model) on training data that includes the historical access patterns 172 for the data store 150 and/or the data files 151 (e.g., associated with a particular user 12 or entity).

Referring back to FIG. 1, in some implementations, a quantity of compression techniques 180 that the compression selector 192 chooses from among is based on a level of the LSM tree the data files 151 are to be stored at. That is, how much effort the compression selector 192 expends in finding an optimal compression technique 180 (where the level of effort translates into a quantity of different compression techniques and/or parameters explored by the compression selector 192) may depend on the level of the LSM tree the data files 151 are to be stored at. For example, data files 151 that are being compacted or stored further up the tree or further from leaves can be expected to be accessed less frequently, and thus more effort in compressing the files is likely to be wasted by future frequent accesses of the data files 151. Furthermore, data files 151 at the lowest levels of the LSM tree may be optimized for write performance. Conversely, data files 151 near leaves of the LSM tree may be accessed more frequently relative to the data files 151 further from the leaves, and in this case the compression selector 192 may expend less effort (e.g., by testing or experimenting or exploring less compression techniques 180 and/or parameters for the compression techniques 180).

For example, for data files 151 that are still accessed frequently or with some regularity (based on the level of the LSM tree and/or the historical access patterns 172 associated with the data files 151), the compression selector 192 may have a first budget that includes testing a first quantity of compression techniques 180. For data files 151 that are accessed less frequently (based on the level of the LSM tree and/or the historical access patterns 172 associated with the data files 151), the compression selector 192 have a second budget that includes testing a second quantity of compression techniques 180, where the first budget is less than the second budget (e.g., the first quantity of compression techniques 180 is less than the second quantity of compression techniques 180). The budget may refer to the amount of effort the compression selector 192 is allowed to expend on determining an optimal compression technique 180 for the particular data file(s) 151. The budget may be based on the level of the LSM tree the data files 151 are to be stored to, the amount of resources currently available, the historical access patterns 172, or any other appropriate metric. In some examples, only "middle" layers or levels of the LSM tree are allocated a budget to optimize storage. The lowest levels may instead always be optimized for write performance while the highest levels will make use of the exploration performed at the middle levels.

The compression selector 192 may select which compression techniques 180 to explore based on, for example, an ordered list of available compression techniques 180, random selection from available compression techniques 180, the historical access patterns 172, and/or previous explorations done on the same or similar data files 151 (e.g., for previous compaction events). The compression selector 192 may select the compression techniques 180 based on the classification of the columns 162 of the data files 151. For example, data files with highly accessed columns 162 may be explored using light-weight compression and/or no compression and/or encoding only. Conversely, infrequently accessed columns may be explored using heavy-weight compression.

For example, after storing the data files 151 at the data store after compacting the data files 151 a first time, the storage controller 160 determines that the stored data files 151 are to be compacted again (e.g., based on a second compaction event). The compression selector 192 may compress at least a portion of the data files 151 using each of a second group of compression techniques 180 (e.g., to explore or experiment using the different compression techniques 180). In this example, the second group of compression techniques 180 is different from a first group of compression techniques 180 the compression selector 192 explored during the first compaction event. That is, the compression selector 192 may rely on previous explorations and/or historical access patterns 172 received since the previous compaction event to guide which compression techniques 180 to explore. For instance, the compression selector 192 opts to not explore a compression technique 180 that exhibited poor performance during a previous compaction event for the same or similar data files 151. Based on compressing the portion of the data file 151 using each of the second group of compression techniques 180, the compression selector 192 may then select one of the second group of compression techniques and store the data files 151 at the data store 150 using the selected compression technique 180.

As used herein, performance of each compression technique 180 refers to a ratio or trade-off between the amount of compression achieved (i.e., how much a size of the data file 151 was reduced or a storage cost of storing the compressed data file 151), the resource or processing cost to compress the data file 151 (i.e., the time and computational resources required), and the resource cost to decompress the data file 151. The weight of each of these factors may be adjusted (and thus the overall performance of the compression technique 180) based on the level of the LSM tree the data file 151 to be stored at and/or the historical access patterns 172 associated with the data file 151. For example, compression techniques 180 to compress a data file 151 that is expected to be accessed very rarely may be weighted such that the compression achieved is given more weight that the resources required to compress/decompress. In contrast, compression techniques 180 to compress a data file 151 that is expected to be accessed frequently may be weighted such that the resources required to compress/decompress the data file 151 is given more weight than the compression achieved.

In some examples, the storage controller 160 determines a target file size for the data files 151 when storing the data files 151 at the data store 150 and the storage controller 160 stores the data files 151 at the data store 150 using the determined target file size. The target file size dictates how much data is in a particular data file 151. Larger file sizes may be more efficient when the data files 151 are likely to be read frequently, while smaller file sizes may be more efficient when the data files 151 are likely to be written or modified more frequently. The storage controller 160 may determine the target file size based on the historical access patterns 172 of the data files 151 (or other similar data files 151).

Thus, implementations herein include a storage controller 160 that optimizes data files 151 for storage at a column-oriented data store 150. The storage controller 160 may update an ordering of the columns 162 of the data files, explore and select an optimal compression technique 180 for the data files, select a target file size for the data files 151, or any combination of the three. The storage controller 160 may use historical access patterns of the data files 151 or other similar data files 151 to optimize the storage. In some examples, the optimization is based on a level of an LSM tree the data files 151 are to be stored at. The storage controller 160 may explore or experiment to determine optimal compression techniques 180 for the particular data file 151 at the particular level the data file 151 is to be stored at based on a budget for the particular data file 151 and/or level of the LSM tree. The storage controller 160 may use previous exploration to guide future exploration of the compression techniques 180. In some implementations, the column ordering and/or compression techniques 180 are configurable by one or more users 12 of the system. For example, the users 12 may configure the compression techniques 180 explored to optimize for storage costs or query costs based on personal use case.

Figure 4:
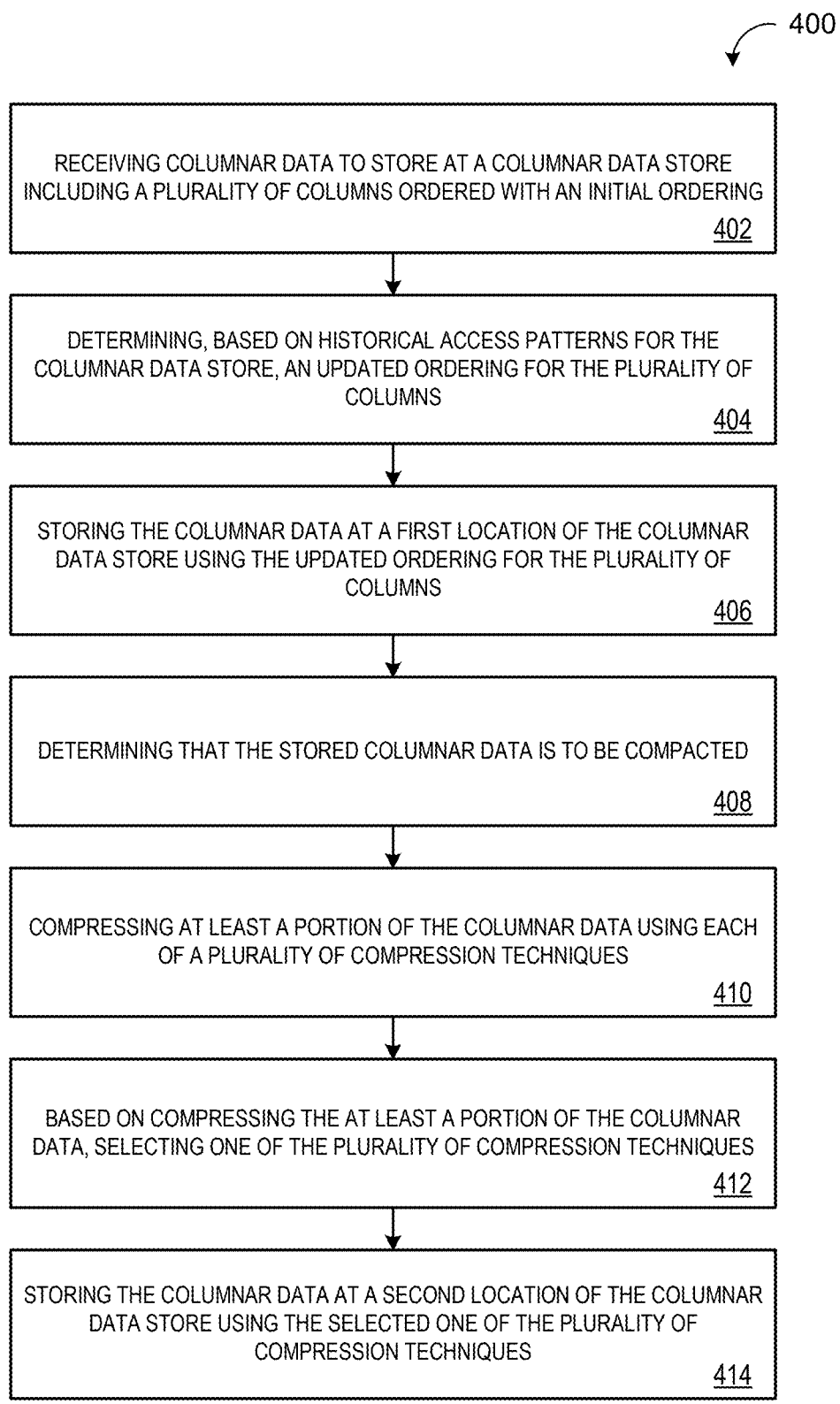
FIG. 4 is a flowchart of an example arrangement of operations for a method of optimizing file storage in data lake tables.

FIG. 4 is a flowchart of an exemplary arrangement of operations for a method 400 of optimizing file storage in data lake tables. The computer-implemented method 400 is executed by data processing hardware 144. The method 400, at operation 402, includes receiving columnar data 151 to store at a columnar data store 150 that includes a plurality of columns 162 ordered with an initial ordering 170i. The method 400, at operations 404, includes determining, based on historical access patterns 172 for the columnar data store 150, an updated ordering 170u for the plurality of columns 162. At operation 406, the method 400 includes storing the columnar data 151 at a first location of the columnar data store 150 using the updated ordering 170u for the plurality of columns 162. At operation 408, the method 400 includes determining that the stored columnar data 151 is to be compacted. The method 400, at operation 410, includes compressing at least a portion of the columnar data 151 using each of a plurality of compression techniques 180. At operation 412, the method 400 includes, based on compressing the at least a portion of the columnar data 151 using each of the plurality of compression techniques 180, selecting one of the plurality of compression techniques 180. The method 400, at operation 414, includes storing the columnar data 151 at a second location of the columnar data store 150 using the selected one of the plurality of compression techniques 180.

Figure 5:
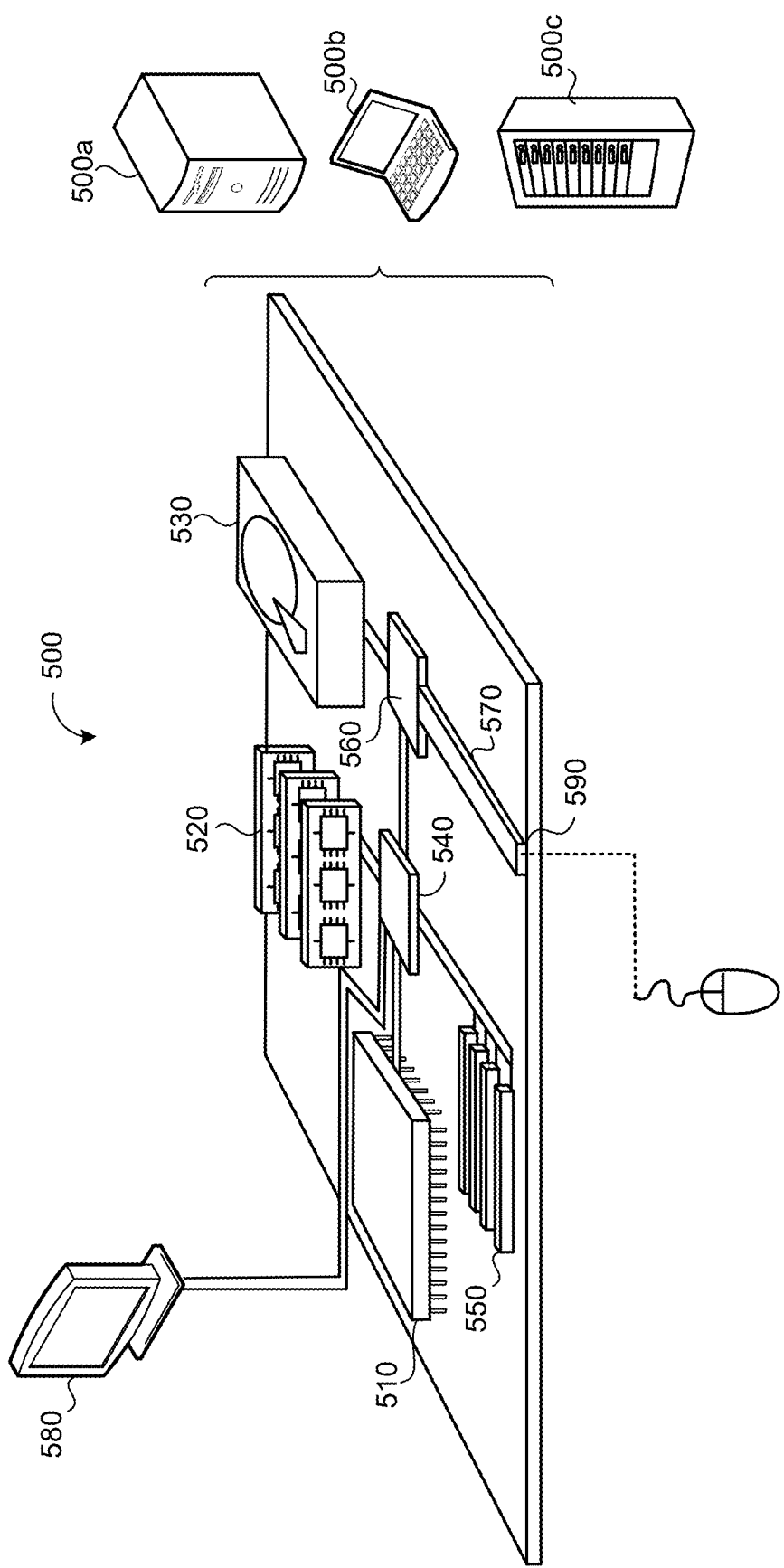
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low-speed interface/controller 560 connecting to a low-speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high-speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random-access memory (DRAM), static random-access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high-speed controller 540 manages bandwidth-intensive operations for the computing device 500, while the low-speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving columnar data to store at a columnar data store of a distributed storage system, the columnar data comprising a plurality of columns, the plurality of columns ordered with an initial ordering;
   determining, based on historical access patterns collected from query executions against the distributed storage system for the columnar data store that indicate a frequency of co-occurrence of at least two columns of the plurality of columns being projected together in queries against the columnar data store, an updated ordering for the plurality of columns, the updated ordering configured to arrange the co-occurring columns into contiguous storage regions within the columnar data store for efficient read coalescing of the co-occurring columns during subsequent query processing to reduce network and computational resource waste associated with reading discontinuous data portions from the distributed storage system;

storing the columnar data at a first location of the columnar data store using the updated ordering for the plurality of columns;

after storing the columnar data at the first location, determining that the stored columnar data is to be compacted;

compressing at least a portion of the columnar data using each of a plurality of compression techniques;

based on compressing at least the portion of the columnar data using each of the plurality of compression techniques, selecting one of the plurality of compression techniques; and storing the columnar data at a second location of the columnar data store using the selected one of the plurality of compression techniques.

2. The method of claim 1, wherein the columnar data store comprises a log structured merge (LSM) tree.

3. The method of claim 2, wherein determining that the stored columnar data is to be compacted is based on a compaction event for the LSM tree.

4. The method of claim 2, wherein a quantity of the plurality of compression techniques is based on a level of the LSM tree the columnar data is to be stored at.

5. The method of claim 1, wherein determining the updated ordering for the plurality of columns comprises predicting, using a model, a co-occurrence of a first column of the plurality of columns with a second column of the plurality of columns.

6. The method of claim 1, wherein determining the updated ordering for the plurality of columns comprises using a clustering algorithm.

7. The method of claim 1, wherein:
the operations further comprise determining a target file size for the columnar data; and
storing the columnar data at the second location of the columnar data store further using the determined target file size.

8. The method of claim 1, wherein the operations further comprise, after storing the columnar data at the second location of the columnar data store:
determining that the stored columnar data is to be compacted again;
compressing at least the portion of the columnar data using each of a second plurality of compression techniques, the second plurality of compression techniques different than the plurality of compression techniques;
based on compressing at least the portion of the columnar data using each of the second plurality of compression techniques, selecting one of the second plurality of compression techniques; and
storing the columnar data at a third location of the columnar data store using the selected one of the second plurality of compression techniques.

9. The method of claim 1, wherein selecting the one of the plurality of compression techniques is further based on:
a storage cost of the one of the one of the plurality of compression techniques; and
a processing cost of the one of the plurality of compression techniques.

10. A system comprising:
data processing hardware; and
memory hardware in communication with the data processing hardware, the memory hardware storing instructions that when executed on the data processing hardware cause the data processing hardware to perform operations comprising:

receiving columnar data to store at a columnar data store of a distributed storage system, the columnar data comprising a plurality of columns, the plurality of columns ordered with an initial ordering;

determining, based on historical access patterns collected from query executions against the distributed storage system for the columnar data store that indicate a frequency of co-occurrence of at least two columns of the plurality of columns being projected together in queries against the columnar data store, an updated ordering for the plurality of columns, the updated ordering configured to arrange the co-occurring columns into contiguous storage regions within the columnar data store for efficient read coalescing of the co-occurring columns during subsequent query processing to reduce network and computational resource waste associated with reading discontinuous data portions from the distributed storage system;

storing the columnar data at a first location of the columnar data store using the updated ordering for the plurality of columns;

after storing the columnar data at the first location, determining that the stored columnar data is to be compacted;

compressing at least a portion of the columnar data using each of a plurality of compression techniques;

based on compressing at least the portion of the columnar data using each of the plurality of compression techniques, selecting one of the plurality of compression techniques; and storing the columnar data at a second location of the columnar data store using the selected one of the plurality of compression techniques.

11. The system of claim 10, wherein the columnar data store comprises a log structured merge (LSM) tree.

12. The system of claim 11, wherein determining that the stored columnar data is to be compacted is based on a compaction event for the LSM tree.

13. The system of claim 11, wherein a quantity of the plurality of compression techniques is based on a level of the LSM tree the columnar data is to be stored at.

14. The system of claim 10, wherein determining the updated ordering for the plurality of columns comprises predicting, using a model, a co-occurrence of a first column of the plurality of columns with a second column of the plurality of columns.

15. The system of claim 10, wherein determining the updated ordering for the plurality of columns comprises using a clustering algorithm.

16. The system of claim 10, wherein:
the operations further comprise determining a target file size for the columnar data; and
storing the columnar data at the second location of the columnar data store further using the determined target file size.

17. The system of claim 10, wherein the operations further comprise, after storing the columnar data at the second location of the columnar data store:
determining that the stored columnar data is to be compacted again;
compressing at least the portion of the columnar data using each of a second plurality of compression techniques, the second plurality of compression techniques different than the plurality of compression techniques;

based on compressing at least the portion of the columnar data using each of the second plurality of compression techniques, selecting one of the second plurality of compression techniques; and storing the columnar data at a third location of the columnar data store using the selected one of the second plurality of compression techniques.

18. The system of claim 10, wherein selecting the one of the plurality of compression techniques is further based on:
   a storage cost of the one of the one of the plurality of compression techniques; and
   a processing cost of the one of the plurality of compression techniques.

\* \* \* \* \*